United States Patent Office 3,498,759
Patented Mar. 3, 1970

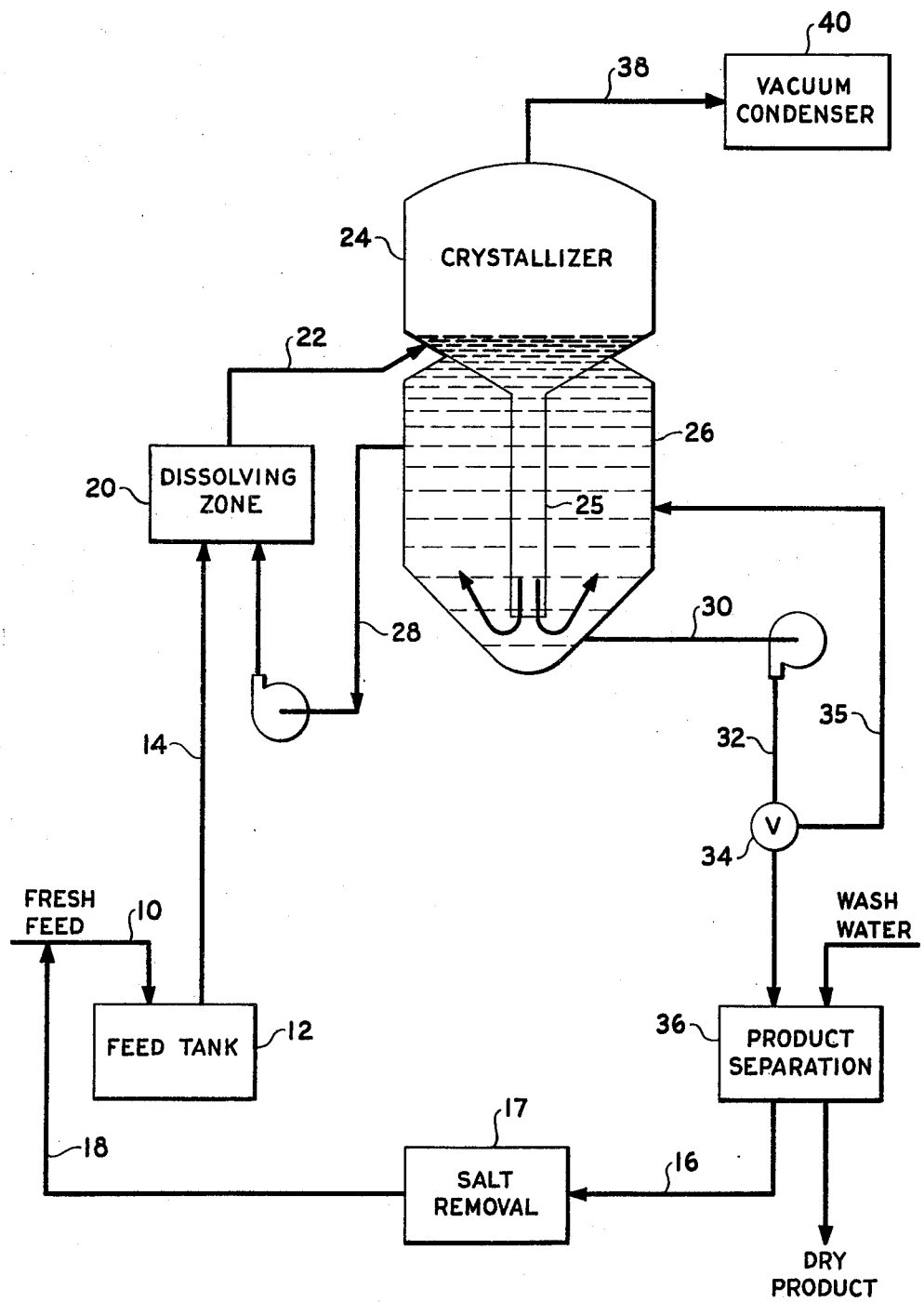

3,498,759
PRODUCTION OF ROUNDED AMMONIUM
PERCHLORATE CRYSTALS
Richard J. Kralik, Youngstown, N.Y., assignor to Hooker
Chemical Corporation, Niagara Falls, N.Y., a corporation of New York
Filed May 28, 1965, Ser. No. 459,571
Int. Cl. B01d 9/02; B01i 9/02; C01b 11/18
U.S. Cl. 23—302
13 Claims

ABSTRACT OF THE DISCLOSURE

There is provided a process for producing rounded ammonium perchlorate crystals comprising alternately passing ammonium perchlorate crystals from a crystallization zone to a dissolving zone, in which crystallization zone the crystals are maintained in a supersaturated solution of ammonium perchlorate to induce crystal growth, and in which dissolving zone the crystals are maintained in a solution below saturation with respect to ammonium perchlorate, said crystals being retained in said dissolving zone for a period of time sufficient to partially dissolve the crystals and wherein said crystal growth in the crystallization zone exceeds the dissolving of the crystals in the dissolving zone, thereby producing rounded crystals of ammonium perchlorate.

---

This invention relates to the production of rounded ammonium perchlorate crystals, and more particularly, to a method of eliminating corners, roughness and edges from ammonium perchlorate during crystallization procedures, and thereby producing crystals having spheroidal configurations.

In the production of ammonium perchlorate, useful in rocket propellant compositions, crystal structure and crystal properties are extremely important in obtaining the ultimate performance from the final propellant composition. Rocket propellant compositions normally comprise a metal, such as aluminum, an oxidizer, such as ammonium perchlorate and a polymerizable liquid binder. The compositions are prepared by mixing the ingredients with the liquid binder, deaerating and casting it into a suitable form and subsequently polymerizing the binder to a hardened state. In that the principle ingredients which provide the thrust are the metal and oxidizer, it is desirable to use these ingredients in as high a portion of the total composition as possible while maintaining the composition viscosity and liquid binder at a minimum. This mixture must be of a suitable consistency whereby the total composition can be deaerated and cast into a suitable form prior to curing.

It has been found that the consistency of the propellant composition, prior to curing, can be maintained at a desirable lower viscosity for a given amount of ammonium perchlorate and metal when the ammonium perchlorate is of a rounded or spherical configuration. Also, the rounded crystals mix with the liquid binder with less friction and consequent heating, thereby lessening the danger of premature detonation of the highly explosive mixture.

It is an object of this invention to provide a method of crystallizing ammonium perchlorate in a rounded or spheroidal configuration suitable for rocket propellant composition. This and other objects will become apparent to those skilled in the art from the description of the invention which follows.

In accordance with this invention, rounded ammonium perchlorate crystals are produced by a process comprising alternately passing ammonium perchlorate crystals from a crystallization zone to a dissolving zone, in which crystallization zone the crystals are maintained in a supersaturated solution of ammonium perchlorate to induce crystal growth, and in which dissolving zone the crystals are maintained in a solution below saturation with respect to ammonium perchlorate, said crystals being retained in said dissolving zone for a period of time sufficient to partially dissolve the crystals and wherein said crystal growth in the crystallization zone exceeds the dissolving of the crystals in the dissolving zone, thereby producing rounded crystals of ammonium perchlorate.

The rounding action by dissolution can be enhanced and controlled quite easily with relatively simple auxiliary equipment used in conjunction with conventional crystallizers. A flow of slurry of representative particle size distribution is continuously withdrawn from the crystallizer growth zone and blended with the flow of undersaturated feed. This combined flow is then passed through a chamber of sufficient volume to give sufficient residence time for the liquid phase to partially dissolve the crystals and to become more nearly saturated. The slurry discharge from the dissolving zone is returned to the growth zone of the crystallizer. The slurry is withdrawn from the growth zone of a crystallizer at a rate high enough to assure that the average crystal will pass through the dissolving zone from several to many times during the course of its growth from seed to product size, depending on the particular design of the dissolving zone.

The term "rounded or spheroidal" means that the product crystals produced by the present process are of a geometric configuration ranging from circular to elliptical or oval cross section, to crystals having rounded edges and corners. As a practical matter, the produced crystals are primarily spheroidal, the average difference between the major and minor radii being not more than a factor of about 2.

The extent of rounding can be controlled by adjusting the undersaturation of the slurry in the dissolving zone, the frequency of passing the crystals through the dissolving zone and the retention time of the average crystal in the dissolving zone. The blended stream of crystallizer slurry and feed stream may also be heated in the dissolving zone to further decrease the saturation level. Heating is very effective in changing the saturation level of ammonium perchlorate solutions in that small changes in temperature greatly increases the solubility of ammonium perchlorate. For material such as ammonium perchlorate, which rapidly increase in solubility with increasing temperature, such heating will greatly enhance the rounding action.

The invention will be more fully described by reference to the drawing which is a partial schematic and flow sheet illustrating the process of this invention.

The process is effected by feeding a source of ammonium perchlorate via line 10 to feed tank 12. Normally, mother liquor removed from product separation zone 36 is passed through salt removal zone 17 and combined with the feed as via line 18. The ammonium perchlorate source can be wet cake, i.e., undried ammonium perchlorate crystals, or, as is normally the case, a solution of the reaction mixture obtained by reacting an alkali metal perchlorate with ammonium chloride or with ammonia and carbon dioxide. Thus, the feed material can be a relatively pure ammonium perchlorate which is substantially free of sodium chloride and sodium carbonate or an ammonium perchlorate feed stream containing impurities such as ammonium or alkali metal chloride, perchlorate, carbonate or bicarbonate. An ammonium perchlorate feed containing impurities is the normal feed material.

In feed tank 12, the feed material is heated, mixed and dissolved with sufficient water so as to provide an ammonium perchlorate containing solution which is below its saturation point with respect to ammonium perchlorate.

The prepared ammonium perchlorate containing solution is passed via line 14 to dissolving zone 20. This solution is at a temperature of about 30 degrees centigrade to 110 degrees centigrade and contains about 10 percent to 50 percent ammonium perchlorate by weight. Such temperature and concentration correspond to provide an ammonium perchlorate solution at less than saturation.

Dissolving zone 20 is a holding tank, heat exchange means, series of pipes, large diameter-high capacity pipes or similar means which will provide a residency time in an undersaturated solution thereby partially dissolving the crystals contained in the solution.

In addition to the feed solution which is passed through dissolving zone 20, a slurry of crystals and mother liquor from lower crystallizer zone 26 of crystallizer 24 is continuously withdrawn via line 28 and cycled through dissolving zone 20. The resulting mixture is maintained below saturation with respect to ammonium perchlorate by the addition of heat to the dissolving zone, the use of sufficient amounts of relatively undersaturated feed solution so as to dilute the combined mixture to below saturation, or a combination of both means thereby providing a suspension of crystals in a solution below saturation.

In that the solution in dissolving zone 20 is below saturation, the crystals will begin to dissolve. The dissolving action is most rapid at the edges and corners thereby rounding the crystal.

A solution is considered to be below saturation when a lowering of the temperature or an increase in concentration is required to crystallize product from the solution. The retention time in the dissolving zone is sufficient to dissolve the most finely divided crystals and to effect a partial dissolution of the larger crystals thereby approaching the saturation of the solution with ammonium perchlorate. It will be readily recognized that the time in dissolving zone 20 can vary widely from a fraction of a second in a hot vastly undersaturated solution to many hours in a nearly saturated solution. Thus, by coordinating the retention time of the crystal with the degree of undersaturation and the frequency of passing the crystals through the dissolving zone, the retention time can be varied from less than one second to about 18 or more hours. Because of the wide time limits, many variations in design can be used and conventional crystallizing equipment is readily modified in a number of ways to obtain the desired results.

The dissolving zone is operated at a temperature of about 40 degrees centigrade to 110 degrees centigrade. When no additional heating is provided other than the hot feed from feed tank 12, the dissolving zone temperature will range between about 40 degrees centigrade and 100 degrees centigrade. The solution in the dissolving zone contains about 15 percent to about 50 percent ammonium perchlorate by weight, the temperature and concentration corresponding to result in a solution of less than saturation.

The solution passing through dissolving zone 20 is fed via line 22 to crystallizer 24.

The crystallizer used can be any conventional evaporation crystallizer which provides an area wherein the liquid within the crystallizer is subjected to an evaporative cooling. Such evaporative cooling is normally effected by subjecting the liquid to subatmospheric pressure by means of a vapor removal means, such as conduit 38 and vacuum condenser 40 in the illustrated crystallizer 24. Water is removed from crystallizer 24 at a rate sufficient to cool the liquid within the crystallizer to a temperature of about 20 degrees centigrade to 90 degrees centigrade and preferably to a normal crystallization temperature of 25 degrees centigrade to 45 degrees centigrade. Sufficient water is removed to cool and concentrate the liquid to a supersaturated condition.

Supersaturated liquor produced by vacuum evaporation in crystallizer 24 is passed via funnel 25 to lower crystallizer zone 26 wherein crystal growth occurs. As crystal growth occurs, a slurry is formed in the crystallizer wherein the solids content of the crystallizer ranges from about 20 percent to 60 percent by volume and preferably between about 30 percent and 45 percent by volume. The term "solids content" means a level to which solids, in a sample withdrawn from the crystallizer, will settle when placed in a graduated cylinder. Thus, if a 1,000 milliliter sample is withdrawn from the crystallizer and placed in a 1,000 milliliter graduated cylinder and if the solids settle to a level up to the 300 milliliter mark, the solids content is considered to be 30 percent by volume.

The slurry within the lower crystallizer is agitated by conventional means so as to maintain the crystallizing product in dynamic suspension. Slurry is removed from lower crystallizer zone 26 via lines 28 and 30. The removal rate varies widely with the particular crystallizer design. The growth rate of the crystals also varies widely with the particular conditions used and the crystallizer design. Therefore, the crystal growth time varies from about an hour up to about 24 or more hours. Thus, during the growth of crystals to product size, the crystals and slurry are passed through dissolving zone 20 and returned to crystallizer 24 an average of 2 to about 100 or more times.

Also withdrawn from lower crystallizator zone 26 via line 30 is a slurry of product size crystals. This slurry is pumped via lines 30 and 32 through valve 34 to product separation zone 36. Valve 34 controls the flow of slurry passed to product separation zone 36. As is normal in start-up operations and often during production, valve 34 may be closed so as to recycle all or part of the slurry via line 35 to lower crystallizer zone 26.

Product separation zone 36 removes the solids from the slurry by conventional means, such as filtration, centrifuging, or other liquid-solids separation techniques. The separated solids are washed, dried and classified. The mother liquor, wash water and under and oversize crystals are then routed to salt removal zone 17 via line 16 and subsequently to feed tank 12 via lines 18 and 10.

Although the drawing illustrates a certain type of crystallizer, it will be readily recognized that various other crystallizers and crystallizing processes can be used wherein the methods of this invention are readily incorporated. Various changes, such as in the salt removal means wherein the impurities, such as sodium chloride or sodium carbonate are removed from the mother liquor can be eliminated in batch operations.

Most crystallization processes are preferably operated, wherein seeding material is added to the crystallizer. Thus, as in the present process, seeding means are preferably incorporated into the process by feeding a controlled quantity of finely divided seed crystals to the crystallizer. This can be accomplished by use of a grinding means on a circulating stream from the crystallizer zone wherein a small portion of the crystals are ground to seed material.

In the crystallization of ammonium perchlorate for rocket propellant use, the particle size distribution of the ammonium perchlorate crystals is very important. There are instances wherein an average particle size of 70 to 100 U.S. Standard Sieve Number, ranging from 40 to 200 U.S. Standard Sieve Number, is desired. On occasions, larger ammonium perchlorate crystals of about two to four times the diameter of the 70 to 100 U.S. Standard Sieve Number are desired. In such instances, the crystallization conditions can be changed without effecting the rounding action created by the process of this invention.

The following examples illustrate certain perferred embodiments of the present invention. Unless other wise indicated, all parts and percentages used herein are by weight and all temperatures in the examples are in degrees centigrade.

EXAMPLE 1

This sample illustrates the process of the present invention in accordance with the specification and drawing.

The process was operated in pilot-plant-sized equipment in a continuous manner by feeding ammonium perchlorate solutions to a feed tank comprised of (1) a solution of sodium perchlorate and ammonium chloride, and (2) an ammonium perchlorate rich solution from the salt removal system. The feed solution was mixed in the feed tank and heated to a temperature of 85 degrees centigrade to 90 degrees centigrade. The resulting mixture had a crystallization point of about 40 degrees centigrade to 45 degrees centigrade, indicating that the mixture was heated to about 25 degrees centigrade above its saturation temperature.

A feed stream of about 6 gallons per minute was pumped from the feed tank to dissolving zone 20. A second stream was also fed to dissolving zone 20 from lower crystallizer zone 26 by withdrawing crystallizer slurry via line 28 from the crystallizer at a rate of 7 to 10 gallons per minute. The withdrawn crystallizer slurry contained 40 percent to 45 percent ammonium perchlorate crystals by volume in a supersaturated solution of ammonium perchlorate. The slurry temperature was 35 degrees centigrade, corresponding to the temperature within the crystallizer.

The dissolving zone 20 was an agitated 2,000 gallon tank which was regulated so as to retain 1,500 gallons of solution. The two feed streams were intimately contacted and mixed within the dissolving zone thereby resulting in an undersaturated slurry at a temperature of about 60 degrees centigrade to 65 degrees centigrade. The undersaturated slurry contained about 25 percent by volume of ammonium perchlorate crystals. No additional heating or cooling was required in that sufficient driving force was provided by the heat accompanying the feed liquor to promote partial dissolving and rounding of the crystals. The average retention time of an individual crystal within the dissolving zone was about 1.2 hours to 1.9 hours. However, the continuous pumping of slurry allowed the average crystal to return several times to the dissolving zone before being withdrawn as product, in that the average crystallization time was about 8 hours.

The slurry from the dissolving zone was subsequently pumped to the crystallizer as feed stream 22. The crystallizer had an active crystallizing capacity of 1,000 gallons. Cooling of the feed solution was effected by evaporative cooling under an absolute pressure of about 33 millimeters of mercury. The flash evaporation cooled the crystallizer slurry to a temperature of about 35 degrees centigrade, thereby bringing the slurry to a supersaturated condition. The supersaturated condition within the crystallizer caused crystal growth.

A stream of product sized crystals was withdrawn from the lower crystallizer zone 26 via line 30 at a rate of 30 to 40 gallons per minute. This slurry was passed through line 32 to product separation zone 36 wherein the solids were separated from the mother liquor by means of a horizontal vacuum filter. Valve 34 metered the flow as required to the product separator. The excess of the flow through lines 30 to 32 was recycled to the crystallizer via line 35.

In the product separation zone, the product was washed to remove the impurities which were principally sodium chloride. The wet cake was dried and subsequently packaged. The average production rate established during a two day period was about 5,000 pounds per eight hours of operation.

Screen analysis of the product obtained resulted in a size distribution, based on U.S. Standard Sieve Numbers, of 2 percent to 3 percent retained on a 50 mesh screen, 80 percent to 85 percent through a 50 mesh screen and maintained on a 100 mesh screen and 8 percent to 10 percent through a 100 mesh screen and retained on a 140 mesh screen. The product was examined with a microscope and noted to have well rounded corners and edges. The crystals were determined to be essentially spheroidal in shape with the major and minor radii nearly equal.

EXAMPLE 2

The method of Example 1 was repeated wherein seeding of the crystallizer solution was effected by withdrawing small proportions, averaging about one gallon per minute, from return line 35 and passing this stream to a colloid mill. The crystals within the stream were intentionally fractured to a 0.01 to 50 microns in size, the average particle size being in the range of 0.05 to about 25 microns. A microscopic examination of the fractured crystals indicated that the resulting irregular shapes had sharp edges and corners. Further, when the crystallizer was operated so as to obtain the particular benefits of the seeding with the small seed crystals, and wherein the dissolving zone of this invention was not used, the product crystals exhibited large flat surfaces of the normal crystal growth faces. However, when the crystallizer was operated using the dissolving zone of the present invention, the product was found to have well rounded edges and corners and to be substantially spheroidal in shape.

EXAMPLE 3

The method of Example 1 was also operated in production size equipment wherein the total liquid volume within the crystallizer system was about 9,000 gallons of liquid and suspended solids. In the operation of such a high capacity system, the holding tank used in Example 1 was eliminated in that sufficient dissolving action for the crystals in an undersaturated solution was obtained by mixing a 90 degree centigrade feed stream of about 400 gallons per minute from the feed tank with a 400 gallon per minute flow of crystallizer slurry. The crystallizer slurry was a 75 degree centigrade to 80 degree centigrade solution containing about 45 percent by volume of ammonium perchlorate crystals. The resulting mixture of crystallizer slurry and undersaturated feed stream resulted in an undersaturated slurry of ammonium perchlorate at a temperature of about 85 degrees centigrade.

The undersaturated slurry was passed through a pipe at a high velocity whereby a retention time of 2 to 3 seconds was obtained for the average crystal prior to returning to the crystallizer. The internal surfaces of the pipe were designed with irregularities thereon so as to effect extensive mixing of the passing stream.

The average crystal passed through the dissolving zone every 20 minutes during crystallization, thereby being partially dissolved about 50 times in growing to a product size crystal. The short residency time in the dissolving zone was supplemented by the increased frequency of dissolving with shorter growth intervals between the dissolving phases.

In that the crystallizer was operated at conditions favoring larger crystal formation than that of Example 1, the average particle passed through a 30 and was retained on a 40 or 50 U.S. Standard Sieve Number. On examination, the crystal were found to be substantially spherical in shape with the major and minor radii nearly equal.

While there have been described various embodiments of the present invention, the methods described are not intended to be understood as limiting the scope of the invention. It is realized that changes therein are possible. It is further intended that each element recited in any of the following claims is to be understood as referring to all elements for accomplishing substantially the same results in substantially the same or equivalent manner. It is intended to cover the invention broadly in whatever form its principles may be utilized.

What is claimed is:

1. A process for producing rounded ammonium perchlorate crystals comprising alternately passing ammonium perchlorate crystals from a crystallization zone to a dissolving zone, in which crystallization zone the crystals are maintained in a supersaturated solution of ammonium perchlorate to induce crystal growth and in which dissolving zone, the crystals are maintained in a solution below saturation with respect to ammonium perchlorate for a period of time sufficient to partially dissolve the crystals and wherein said crystal growth in the crystallization zone exceeds the dissolving of the crystals in the dissolving zone, and withdrawing the partially dissolved crystals from the dissolving zone, thereby producing rounded crystals of ammonium perchlorate.

2. The process of claim 1 wherein the alternate passing of ammonium perchlorate crystals from a crystallization zone to a dissolving zone is carried out continuously.

3. The process of claim 1 wherein the residence time of the crystals in the dissolving zone is coordinated with the degree of undersaturation of the solution in the dissolving zone to partially dissolve the crystals.

4. The process of claim 1 wherein the average crystal is passed through the dissolving zone about 2 to 100 times during growth to a product size crystal.

5. The process of claim 1 wherein the average residence time of the crystals in the dissolving zone is about one second to about 18 hours.

6. The process of claim 1 wherein the solution in the dissolving zone is maintained at less than saturation by mixing an undersaturated feed stream at a temperature of 30 degrees centigrade to 110 degrees centigrade with a supersaturated slurry from the crystallization zone at 20 degrees centigrade to 90 degrees centigrade to produce an undersaturated slurry in the dissolving zone at 40 degrees centigrade to 110 degrees centigrade.

7. A process for producing rounded ammonium perchlorate crystals comprising alternately and continuously passing ammonium perchlorate crystals from a crystallization zone to a dissolving zone, in which crystallization zone the crystals are maintained in a supersaturated solution of ammonium perchlorate to induce crystal growth and in which dissolving zone the crystals are maintained in a solution below saturation with respect to ammonium perchlorate for a residence time of about one second to about 18 hours, said time being sufficient to partially dissolve the crystals and wherein said crystal growth in the crystallization zone exceeds the dissolving of the crystals in the dissolving zone, thereby producing rounded crystals of ammonium perchlorate.

8. A process for the production of rounded ammonium perchlorate crystals comprising withdrawing from a crystallization zone, a slurry of crystals and supersaturated mother liquor, reducing the concentration of the supersaturated mother liquor to below saturation, retaining the crystals in the liquor of reduced concentration for a period of time sufficient to partially dissolve the crystals, returning the partially dissolved crystals and liquor to the crystallization zone, increasing the liquor concentration with respect to ammonium perchlorate to supersaturation thereby inducing crystal growth, repeating said partial dissolving and crystallization steps continuously whereby the growth of the crystals within the crystallization zone exceeds the dissolving of the crystals in the undersaturated liquor so as to produce rounded ammonium perchlorate crystals, and recovering the rounded ammonium perchlorate crystals.

9. The process of claim 8 wherein the supersaturated liquor in the crystallization zone contains 20 percent to 60 percent by volume of ammonium perchlorate crystals.

10. The process of claim 8 wherein the supersaturated mother liquor from the crystallization zone is reduced to below saturation by mixing with an undersaturated feed liquor, said feed liquor having a temperature of about 40 degrees centigrated to 110 degrees centigrade.

11. The process of claim 8 wherein crystals are retained in a liquor of reduced concentration at a temperature of 40 degrees centigrade to 110 degrees centigrade for an average residence time of about one second to 18 hours.

12. The process of claim 8 wherein the concentration of the liquor returned to the crystallization zone is increased to supersaturation with respect to ammonium perchlorate by reducing the temperature of the solution to about 20 degrees centigrade to 90 degrees centigrade.

13. A process for the production of rounded ammonium perchlorate crystals comprising withdrawing from a crystallization zone, a slurry of crystals and supersaturated mother liquor, blending the withdrawn slurry with a 40 degrees centigrade to 110 degree centigrade feed solution containing ammonium perchlorate to yield a blended liquor below saturation, retaining the crystals in the blended liquor for about one second to about 18 hours to patrially dissolve the crystals, returning the partially dissolved crystals and liquor to the crystallization zone, bringing the liquor to a supersaturated condition with respect to ammonium perchlorate by evaporatively cooling to a temperature of 20 degrees centigrated to 90 degrees centigrade, thereby inducing crystal growth, repeating said partial dissolving and crystallization steps continuously, whereby the average crystal passes through the dissolving zone about 2 to 100 times during growth to a product size crystal and wherein the growth of the crystals within the crystallization zone exceeds the dissolving of the crystals in the undersaturated liquor.

References Cited
UNITED STATES PATENTS

| | | | |
|---|---|---|---|
| 2,739,873 | 3/1956 | Schumacher | 23—85 |
| 3,147,160 | 9/1964 | McCrone | 23—295 |
| 3,218,121 | 11/1965 | Tufts | 23—85 |
| 3,222,231 | 12/1965 | Markels et al. | 23—295 |
| 3,307,903 | 3/1967 | Lazari | 23—85 |
| 3,383,180 | 5/1968 | Kralik et al. | 23—302 |

WILBUR L. BASCOMB, JR., Primary Examiner

U.S. Cl. X.R.

23—85, 313; 149—19; 264—117